(12) United States Patent
Offredo et al.

(10) Patent No.: US 8,914,339 B2
(45) Date of Patent: Dec. 16, 2014

(54) DEVICE FOR MANAGING DATA FILTERS

(75) Inventors: Gaétan Offredo, Graffenstaden (FR); Frédéric Pennerath, Illkirch (FR)

(73) Assignee: Alcatel Lucent, Boulogne-Billancourt (FR)

( * ) Notice: Subject to any disclaimer, the term of this patent is extended or adjusted under 35 U.S.C. 154(b) by 543 days.

(21) Appl. No.: 10/511,898

(22) PCT Filed: Apr. 22, 2003

(86) PCT No.: PCT/FR03/01267
§ 371 (c)(1),
(2), (4) Date: Oct. 20, 2004

(87) PCT Pub. No.: WO03/092241
PCT Pub. Date: Nov. 6, 2003

(65) Prior Publication Data
US 2005/0182815 A1 Aug. 18, 2005

(30) Foreign Application Priority Data
Apr. 23, 2002 (FR) ...................................... 02 05091

(51) Int. Cl.
*G06F 7/00* (2006.01)
*G06F 17/00* (2006.01)
*H04L 29/06* (2006.01)

(52) U.S. Cl.
CPC .................................. *H04L 63/0263* (2013.01)
USPC ........................................................ 707/694

(58) Field of Classification Search
CPC ............................ G06F 21/62; H04L 63/0263
USPC ...................... 713/201; 705/10; 717/101, 103; 709/229, 225, 238, 219, 220, 203; 726/11, 12, 4; 711/118; 707/694
See application file for complete search history.

(56) References Cited

U.S. PATENT DOCUMENTS

| | | | | |
|---|---|---|---|---|
| 6,170,012 B1 * | 1/2001 | Coss et al. | ..................... | 709/229 |
| 6,173,364 B1 * | 1/2001 | Zenchelsky et al. | .......... | 711/118 |
| 6,243,815 B1 * | 6/2001 | Antur et al. | ..................... | 726/11 |
| 6,463,474 B1 * | 10/2002 | Fuh et al. | ..................... | 709/225 |
| 6,578,151 B1 * | 6/2003 | Nilsen | ............................. | 726/11 |
| 6,691,168 B1 * | 2/2004 | Bal et al. | ....................... | 709/238 |
| 6,704,873 B1 * | 3/2004 | Underwood | .................... | 726/12 |

(Continued)

FOREIGN PATENT DOCUMENTS

EP 0 856 974 A 8/1998
EP 0 909 075 A 4/1999

*Primary Examiner* — Jacob F Bétit
*Assistant Examiner* — Christy Lin
(74) *Attorney, Agent, or Firm* — Wolff & Samson, PC.

(57) ABSTRACT

A data processing device (1) is installed in a data processing server (2) adapted to receive primary data and to transmit said primary data after application by control means (5) of dedicated processing based on primary rules. The device comprises, firstly, a first table (T1) in which are stored sets of at least one primary rule, called "primary metarules", in a parameterizable form, in corresponding relationship to primary identifiers, and, secondly, management means (8) intended to be coupled to the control means (5) and adapted, on receipt of auxiliary data representing operating parameters delivered by the control means (5) after the reception by the server (2) of secondary data, to select at least one of the primary identifiers in the first table (T1) and associate the auxiliary data therewith in such a manner as to define the dedicated processes.

20 Claims, 1 Drawing Sheet

(56) References Cited

U.S. PATENT DOCUMENTS

| | | | |
|---|---|---|---|
| 6,718,535 B1 * | 4/2004 | Underwood | 717/101 |
| 6,839,680 B1 * | 1/2005 | Liu et al. | 705/7.33 |
| 6,901,578 B1 * | 5/2005 | Beaven et al. | 717/103 |
| 6,904,449 B1 * | 6/2005 | Quinones | 709/203 |
| 6,941,355 B1 * | 9/2005 | Donaghey et al. | 709/220 |
| 7,131,141 B1 * | 10/2006 | Blewett et al. | 726/12 |
| 7,143,438 B1 * | 11/2006 | Coss et al. | 726/11 |
| 2002/0169858 A1 * | 11/2002 | Bellinger et al. | 709/220 |
| 2003/0018912 A1 * | 1/2003 | Boyle et al. | 713/201 |
| 2003/0079146 A1 * | 4/2003 | Burstein | 713/201 |
| 2003/0167405 A1 * | 9/2003 | Freund et al. | 713/201 |
| 2005/0086325 A1 * | 4/2005 | Slipp et al. | 709/219 |

* cited by examiner

DEVICE FOR MANAGING DATA FILTERS

FIELD OF THE INVENTION

The field of the invention is that of data processing, more particularly that of filtering data at a point in a public or private network connected to another public or private network or to user terminals.

BACKGROUND OF THE INVENTION

Data filtering is generally provided by data processing servers equipped with a processing device called a firewall. A firewall is usually intended to protect private (or internal) local area networks (LAN) and isolated user terminals from external attack or intrusion, generally originating from a public (or external) wide area network (WAN), such as the Internet. It may also be used to restrict access by users of a private network to a public network and/or to protect the server from the internal and external networks.

The firewall must be configured to provide at least one of the above-mentioned functions, or in other words to be able to filter packets of data received by the server in which it is installed. Primary (or elementary) rules defining filters are generally used for this purpose. Configuring the firewall therefore consists in applying thereto an ordered series (in the mathematical sense of the term) of active filters. On receiving a packet of data, the characteristics of the packet are compared to those of the filters of the ordered series, and only packets having characteristics compatible with those of the filters are allowed to pass.

Configuring a firewall is a difficult operation that is carried out manually by the administrator of the network to which it belongs. Because of this static manual intervention, the resulting configuration may be functionally correct but unsuitable or less than the optimum. It may even be erroneous. In all those cases, the performance of the server is generally degraded.

As networks evolve frequently, firewalls must be reconfigured regularly, which not only increases the risk of error or unsuitability but also takes up a great deal of the network administrator's time.

Thus one object of the invention is to overcome some or all of the above-mentioned drawbacks by proposing a firewall filter management device taking account in real time of modifications and evolutions of the parameters of the network or the services offered by the network, as well as of unpredictable events.

To this end it proposes a data processing device adapted to be installed in a data processing server adapted to receive primary data (or data packets) and to transmit said primary data after application of dedicated processing based on primary rules by control means of the firewall type.

SUMMARY OF THE INVENTION

The device is characterized in that it comprises i) a first table storing "definitions/prototypes" of sets of primary rules, called "primary metarules", in a parameterizable form and in corresponding relationship to primary identifiers (each primary metarule or set comprising at least one primary rule) and ii) management means adapted to be coupled to the control means and, on receipt of auxiliary data representing operating parameters delivered by the control means after the reception by the server of secondary data, to select at least one of the primary identifiers in the first table and associate the auxiliary data therewith so as to define the dedicated processes.

In the present context the expression "auxiliary data" means data (or values) that must be assigned to operating parameters of primary rules of a metarule that is to be implemented in the control means, such as a firewall, after reception of secondary data by the server. Also, in the present context the expression "secondary data" means any information received by the server (or its control means) whose content is interpreted as a requirement for reconfiguration of the control means. This may refer to data (or fields) contained in primary data packets or to events occurring in a network, for example the addition of a card.

Thus the management means are able to reconfigure the control means each time that this proves necessary, dynamically, and without human intervention, on the basis of primary metarules defined and stored in the first table and information (auxiliary data) supplied by the server.

According to another feature of the invention, the device may comprise a second table accessible to the management means (and preferably incorporated therein, like the first table) in which are stored secondary identifiers each in corresponding relationship to at least one selected (or activated) primary identifier associated with auxiliary data (i.e. that designates metarules applied in the control means with operating parameters represented by the auxiliary data). In this case, it is advantageous if the management means are able, on receiving auxiliary data, to determine if corresponding selected secondary identifiers are already present in the second table, in order to associate therewith new auxiliary data intended to adapt the dedicated process. This means that only the part of the configuration that needs to be modified is modified, rather than the whole configuration.

Certain selected primary metarules in the second table may be grouped into secondary metarules also represented by secondary identifiers associated with auxiliary data.

A secondary identifier may or may not be identical to a primary identifier. For example, a primary metarule may have the same (primary) identifier in the first and second tables if it is executed only under a single set of parameters (or set of auxiliary data) in the firewall. In contrast, a primary metarule should carry a secondary identifier different from its primary identifier if it is executed under different sets of parameters in the firewall.

These (primary) metarules and "super" (secondary) metarules further reduce the (re)configuration time.

The management means preferably comprise a multiplicity of management submodules each intended to manage the association of auxiliary data with one or more primary or secondary metarules (what is important being that the submodules partition the primary or secondary metarules for which they are responsible), and are adapted, on receiving auxiliary data, to determine which of the management submodules corresponds to them. This facilitates and shortens reconfiguration.

Moreover, the management means may be adapted, on receiving certain auxiliary data, to delete at least one of the stored secondary identifiers from the second table (this amounts to deselecting or deactivating a primary or secondary metarule at the level of the control means). The management means may equally be adapted, on receiving complementary data communicated by the server, to adapt, delete or modify primary or secondary metarules or auxiliary data in the second table associated with the primary or secondary metarules.

Moreover, the management means and the table are preferably part of a "metafirewall" managing a firewall equipping the server and comprising the control means.

The invention also provides a firewall equipped with a device of the type described hereinabove.

The invention further provides a method of dynamically processing data, the method consisting in applying dedicated processes to primary data received by a data processing server on the basis of primary rules so that the received primary data is processed before it is transmitted by the server.

This method is characterized in that it comprises a preliminary step in which there are stored in a first table sets of at least one primary rule, called "primary metarules", in a parameterizable form and in corresponding relationship to primary identifiers, and, on receipt of auxiliary data representing operating parameters delivered by the server after the receipt of secondary data, at least one of the primary identifiers in the first table is selected and the auxiliary data is associated with the primary identifier so as to define the dedicated processes.

According to another feature of the invention, during the preliminary step, secondary identifiers each in corresponding relationship to at least one selected primary identifier associated with auxiliary data are stored in a second table.

Certain primary metarules in the second table may be grouped into secondary metarules represented by secondary identifiers.

According to another feature of the invention, selection of the primary or secondary metarules in the first table and modification of the auxiliary data in the second table associated with the secondary identifier representing the selected primary or secondary metarules are executed in parallel.

Moreover, the method may delete at least one of the primary or secondary metarules stored in the second table when certain auxiliary data is received. Likewise, primary or secondary metarules may, on receipt of complementary data communicated by the server, be added to, deleted from or modified in the second table.

The device and the method according to the invention are very specifically, although not exclusively, suitable for filtering data in public and private telecommunication networks.

BRIEF DESCRIPTION OF THE DRAWINGS

Other features and advantages of the invention will become apparent on reading the following detailed description and examining the appended drawings, in which.

DETAILED DESCRIPTION OF THE INVENTION

The appended drawings are for the most part of a specific nature and consequently constitute part of the description of the invention as well as, if necessary, contributing to the definition of the invention.

Figure 1:
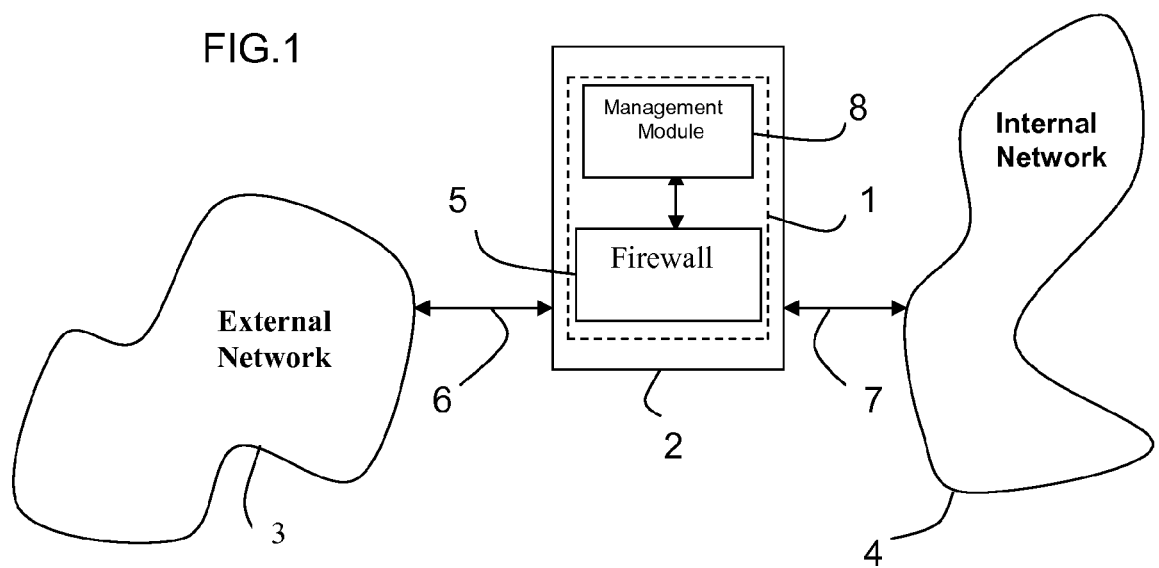
FIG. 1 shows very diagrammatically a server connected to private and public networks and equipped with a device according to the invention.

The following description refers to a data processing device 1 installed in a data processing server 2 installed at a connection node (or point) between a public (or external) network 3 and a private (or internal) network 4, as shown in FIG. 1. However, the server could be installed in many other places, for example at a service provider or cable operator.

For example, the public network 3 is the Internet and the private network 4 is a local area network (LAN) connected to a multiplicity of user terminals.

Of course, the device 1 could be installed in an external unit of the auxiliary equipment type connected to the server 2, which would then be connected directly to the external network (the Internet).

In the example shown, the server is of the "router" type, in the sense that incoming and outgoing (primary) data packets are substantially identical. For example, the server 2 is adapted to exchange voice data. For example, it is equipped with a plurality of electronic circuit cards that communicate over the internal network 4. One of these cards provides access to the external network 3 (here the Internet) and therefore incorporates WAN interfaces (ADSL, ISDN, Ethernet). Each card has its own privileges, in particular with regard to the type of traffic that it may generate on the internal network 4, given the other data processing hardware of the internal network.

The server 2 preferably also hosts configurable or parameterizable services, for example an electronic mail module, an Intranet module, a virtual private network (VPN) module, etc.

The server 2 is also equipped with a firewall 5 well known to the person skilled in the art and intended mainly to filter primary data packets received either from the external network 3 via the input/output interface 6 or from the internal network 4 via the input/output interface 7.

The firewall 5 thus protects the user terminals Ti, or here the private network 4, from aggression and attack originating from the exterior network 3.

Any type of filtering may be envisaged, provided that it is based on the application of parameterizable elementary (or primary) rules to the primary data packets received by the server 2. It may be generalized to the whole of a network or to portions of a network, or adapted to each user. If it is adapted to each user, the filtering applies equally to authentication of the user.

Of course, the firewall may be configured to provide functions other than filtering. It may in particular store certain information exchanged between the user terminals and the external network. This is generally a question of saving in a suitable memory the coordinates of connections previously accepted (user address, addresses (for example URLs) of pages visited on various websites, date and time of visit). It may also be configured to feed data packet analyses to higher levels of the OSI model of the firewall, for example for the firewall to be able to decide whether to accept or reject a packet as a function of elements of its application layer. It may further be configured to retain a trace of certain packets exchanged ("LOG" mode) and/or to modify the content of certain packets (network address translation (NAT) mode—for example for masking IP addresses of the internal network). It may also be configured to detect viruses.

In the example shown, the firewall 5 constitutes a portion of the device 1 according to the invention. However, the device 1 could instead simply be coupled to a "native" firewall, in order to manage and control its configuration dynamically.

One example of a processing device 1 of the invention is described in detail next with reference to FIG. 2.

As indicated hereinabove, in this example the device 1 comprises, firstly, a control module constituting the firewall 5. This firewall being substantially identical to standard (or native) firewalls, it is not described in detail. In particular its layered structure is ignored in what follows as it is perfectly familiar to the person skilled in the art.

The firewall module 5 is intended to receive primary data packets from the server 2 via one of its input/output interfaces 6 and 7 in order to apply thereto dedicated processing (or filtering) operations defined on the basis of parameterizable elementary (or primary) rules.

To be more precise, the firewall module 5 is first configured by installing an ordered series of parameterizable primary rules defining active filters, so that said filters may be applied to the packets sequentially and in an ordered fashion as a function of their own characteristics, such as source and destination addresses, input and output network addresses, exchange over IP protocols, such as TCP, UDP or ICMP (in the case of the Internet, for example), or as a function of parameters adapted to the exchange protocol, such as source and destination ports in the case of the TCP and the UDP or packet type in the case of the ICMP.

The configuration of a firewall must generally prohibit all traffic by default and the active filters should authorize only certain subsets of traffic that must be authorized. For example, a router connecting an internal network to the Internet may apply the following simplified rules:

- accept packets relating to a packet previously accepted;
- accept packets coming from the internal network (LAN) and going to the Internet, for example if they are of the HTTP or HTTPS (TCP/80 and TCP/443) type;
- accept packets coming from the LAN and going to the router, for example if they are of the DNS (UDP/53) or Echo Request (ICMP, request echo) type;
- accept packets relating to the mail server on a company LAN at a specified address "*@*", for example SMTP (TCP/25) packets coming from the Internet and going to the address *@* on the LAN or SMTP and PoP3 (TCP/25 and TCP/110) packets coming from the address *@* and going to the Internet.

As a function of the filtering results, the firewall module 5 delivers to the server 2 either the processed primary data, i.e. the primary data when filtered and where applicable completed and/or modified, or a message rejecting the received primary data. Of course, the primary data may also merely pass through the server after it is accepted by the firewall module 5.

The device 1 comprises a management module 8 for optimizing the ordered series of elementary rules defining the configuration of the server, but more importantly enabling it to be reconfigured dynamically, in the optimum manner, each time that the server 2 (or its firewall module 5) receives secondary data corresponding, for example, to a modification on the internal network 4 or to an unpredicted event on the internal network 4 or the external network 3, as well as providing it with a high level of security.

To be more precise, the management module 8 is intended to adapt the configuration of the firewall module 5 dynamically, firstly to the physical (or hardware) characteristics of the server 2, for example the number of electronic circuit cards that it contains, the type of card, or the topology of the internal network 4, secondly, to the operating configuration of the server, for example so that it may provide certain parameterizable internal and/or external services, which are therefore liable to evolve, where applicable with specific restrictions for certain terminals and/or on the presence of a user license, and, thirdly, the occurrence of unpredicted internal and/or external events, such as unlisted attacks or listed attacks, for example attempts to connect to hosted services (http, VPN, telnet), port scanning attempts, modification of traffic at LAN/WAN interfaces, such as connection to/disconnection from an Internet site or service, links with remote terminals, or occurrences/disappearances of secure (or encrypted) tunnels associated with an authentication process, or stimuli generated during the execution of tasks by the services or by a card.

To fulfil the functions cited above, the management module 8 includes a configuration module 9 coupled to a "connection" module 10 that is also called a "metafirewall" module and is coupled to the firewall module 5.

If the server 2 receives secondary data relating to modifications of physical (or hardware) characteristics, to (modifications of) service parameters, or to "contextual" information (stimuli), it generates auxiliary (or complementary) data addressed to the management module 8 to request it to (re)configure its firewall module 5. On receiving this auxiliary data, the management module 8 communicates it to its first configuration module 9.

The configuration module 9 is a decision unit that decides on the opportunity to make modifications to the current configuration of the firewall module 5, while the metafirewall 10 is responsible for its practical implementation.

The metafirewall 10 includes an interface (or "engine") submodule coupled to the firewall module 5 and to at least a first memory 12 in which is stored a first table T1 of the correspondences between data defining parameterizable elementary (or primary) rules and primary identifiers.

To be more precise, definitions/prototypes of sets (or classes) of elementary (or primary) rules called (primary) metarules are stored in the first table. Each metarule is specific to a chosen filtering category. Each set or class (or primary metarule) comprises at least one elementary or primary rule, but a plurality of elementary rules are generally required to define a filter.

A primary identifier is associated with each primary metarule or class of rules. The metarules therefore each have a definition (or prototype) stored in the first table T1. These definitions are preferably produced with the aid of a compilation tool, during the design phase of the device, and allowing for the firewall module 5 and its use. In fact, the compilation tool produces metarules whose content conforms to the firewall module 5 (or which may be reflected in equivalent primary rules understandable by the firewall module 5).

The first configuration module 9 knows the list of the primary identifiers of the metarules and the type of auxiliary data to which they correspond. Consequently, on receiving auxiliary data (for example indicating that a new ISDN type IP connection has been requested by a terminal of the internal network 4), the first configuration module 9 may deduce therefrom, firstly, the data type(s), and consequently the metarule(s) that it must associate with the auxiliary data for the firewall module 5 to be (re)configured. It then supplies the engine 11 of the metafirewall 10 with the primary identifier(s) and the associated auxiliary data (or parameter values).

In a first embodiment, on receiving primary identifier(s) and auxiliary data (or parameter values), the engine 11 extracts from the first table T1 the associated definition and assigns to the parameters of the designated primary metarules the received values (or auxiliary data). In this way it generates one or more new primary metarules that it transmits to the firewall module 5, in order for these metarule(s) to be substituted for or added to the rule(s) that have become inappropriate.

This embodiment modifies only the part of the configuration of the firewall module 5 that relates to the auxiliary data supplied by the server 2, and is advantageous if the firewall module 5 is able to supply its configuration parameters simply and quickly. In this case, the engine 11 can tell which configuration is the current configuration in the firewall module 5 and modify only the parameters that have changed. This first embodiment, however, may not be the optimum embodiment if the firewall module 5 is not designed to supply its configuration parameters, or is unable to do so simply and quickly. In fact, since the primary metarule that has been activated in the firewall module 5 is not known, it is necessary to calculate all its rules again using the parameter values supplied, which may prove a somewhat lengthy process if this class comprises a large number of elementary rules. It may even be difficult or even impossible, especially in the case of random events, as it presupposes saving all characteristic data of all events and setting the parameters of the primary rules of the firewall module 5, which would amount to transferring the table T2 to an upstream processing level, as described hereinafter.

Figure 2:
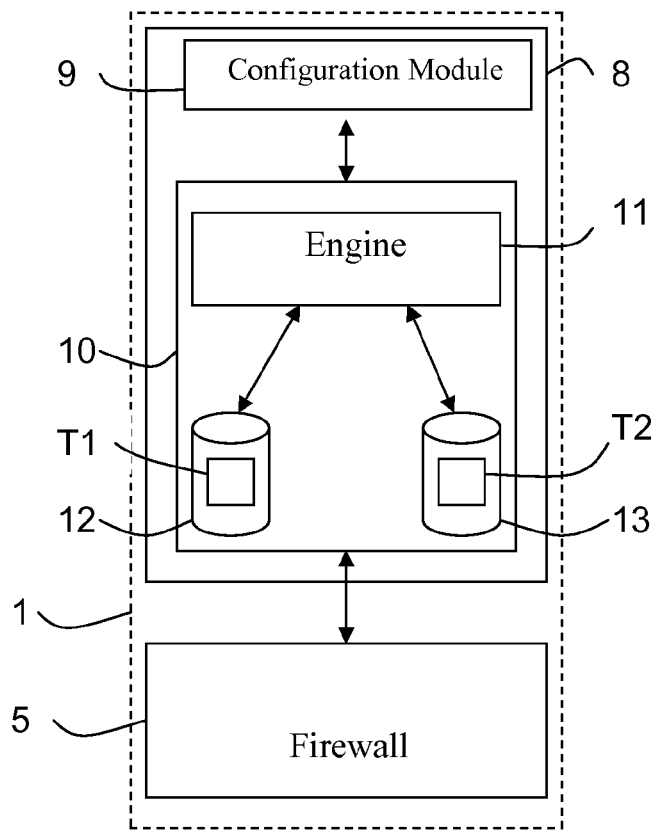
FIG. 2 is a block diagram of one embodiment of a device according to the invention.

The device of the invention may therefore take the slightly different form shown in FIG. 2. In this second embodiment, the metafirewall 10 comprises a second memory 13 that is coupled to the engine 11 and stores a second table T2 of the correspondences between secondary identifiers and primary identifiers, which designate "activated" (or selected) primary metarules, because they are part of the current configuration of the firewall module 5, associated with auxiliary data defining the current values of the parameters of the metarules that are part of that configuration. In other words, the second memory 13 stores the current configuration of the firewall module 5.

Certain secondary identifiers may be identical to certain primary identifiers, for example if a primary metarule is used only with a single set of parameters (or a single set of auxiliary data) in the firewall module 5. However, a secondary identifier differs from a primary identifier if the corresponding primary metarule is used with several different sets of parameters in the firewall module 5.

The first configuration module 9 preferably knows the list of secondary identifiers and the type of auxiliary data to which they correspond. Consequently, on receiving secondary identifier(s) and values supplied by the first configuration module 9, the engine 11 first inspects the second table T2 to determine if it includes said secondary identifier(s) in corresponding relationship to auxiliary data (or values), where applicable different from those received.

If this is not the case, it proceeds as in the first embodiment. It therefore extracts from the first table T1 the definition of the metarule associated with the secondary or primary identifier received and assigns the values (or auxiliary data) received to the parameters of that metarule. It may also decide to delete metarules from the second table T2. In this case, it first reconstructs the set of primary rules associated with the old auxiliary data and deletes them from the firewall module 5. Modifying a metarule also presupposes deleting its old version beforehand if the firewall module 5 provides no simple means of identifying the activated primary rules (which may be assumed to be the case, since the metafirewall provides a simple means of identifying metarules using a secondary identifier).

In this way a class of new elementary rules is generated and sent to the firewall module 5, to be substituted for that which has become inappropriate or to be added to the metarules already activated. The secondary identifier of the metarule and the associated auxiliary data is then stored in the second table T2, since from now on they define part of the current configuration.

Nonetheless, if the primary or secondary identifier is present in the second table T2, the auxiliary data associated with the primary identifier is extracted and only the data that must be changed is replaced. Of course, auxiliary data (or values) may also be added if new parameters have been introduced by the first configuration module 9. The firewall module 5 is then sent the modified metarule(s) or the parametered new metarule(s), in order for them to be substituted for or added to those that have become inappropriate. The new auxiliary data is then stored in the second table T2 in corresponding relationship to the associated secondary identifier and the primary identifier, since from now on they define part of the current configuration.

In order to accelerate further the reconfiguration processing, classes of classes (or classes of primary metarules) constituting secondary metarules may also be constituted in the second table T2. In this case, these secondary metarules are associated with secondary identifiers that are also stored in the second table T2 in corresponding relationship to the associated primary identifiers and auxiliary data, if the secondary metarules are activated (or selected) with said auxiliary data.

Priority levels between rules of a primary metarule or between primary metarules of a secondary metarule or between primary or secondary metarules may also be installed in the correspondence tables.

The engine 11 is preferably adapted to delete secondary identifiers associated with primary metarules that are no longer active in the firewall module 5 from the second table T2 at the command of the first configuration module 9. The engine 11 is preferably also adapted to add to or to modify in the second table T2 secondary identifiers associated with new primary or secondary metarules or to add to or remove from a secondary metarule one or more primary metarules, at the command of the first configuration module 9. It may also be adapted, on command, to merge within the same secondary metarule primary or secondary metarules belonging to at least two different primary or secondary metarules or to split a primary or secondary metarule into at least two primary or secondary metarules, to create new filter definitions.

The commands sent by the first configuration module 11 are preferably the result of commands (or complementary data) received from the server 2.

Two illustrative examples of saving data in the second table T2 are described next. As indicated above, the first table T1 includes definitions or prototypes of primary metarules in corresponding relationship to primary identifiers. For example, the primary identifier "Email" designates the following set of three primary rule prototypes:

Rule 1: Flow=FromLanToWan Source=$1 Protocol=tcp DestinationPort=smtp Action=ACCEPT Rule 2: Flow=FromLanToWan Source=$1 Protocol=tcp DestinationPort=pop3 Action=ACCEPT Rule 3: Flow=FromWanToLan Destination=$1 Protocol=tcp DestinationPort=smtp Action=ACCEPT This Email metarule is used to exchange electronic mail between an electronic mail server on the internal network (LAN) and the ISP server on the Internet. It comprises only one parameter (auxiliary data) "$1", which corresponds to the ISP address of the electronic mail server on the LAN.

This parameter is transmitted using a syntax specific to the three primary rule prototypes.

The other parameters ("Protocol-tcp, DestinationPort=smtp" or "FromLanToWan") characterizing the primary rules are defined statically in the first table entry.

If it is wished to activate the primary metarule Email with a server address 10.0.0.1 (or auxiliary data), the primary identifier Email associated with the address 10.0.0.1 is saved in the second table T2, in corresponding relationship to a secondary identifier that may also be Email in this example. In the second table T2, this may be expressed in the following form "Email→Email 10.0.0.1".

The saving may be effected by using a command of the "metafirewall add Email 10.0.0.1" type.

If the server address must subsequently be modified or the metarule Email must subsequently be deleted, then the commands "metafirewall add Email 20.0.0.1" and "metafirewall delete Email", respectively, are launched.

If the installation evolves, for example to include a second electronic mail server with the address "10.0.0.2", and it is wished to manage both servers using a single secondary metarule, then the secondary identifier "server" may be associated with that secondary metarule.

To save this secondary identifier designating a secondary metarule and the associated auxiliary data in the second table T2, the "metafirewall addin Server Email 10.0.0.1" and "metafirewall appendin Server Email 10.0.0.2" commands are launched.

In the second table T2 this may be expressed in the form:
Server→Email 10.0.0.1
Email 10.0.0.2

Should it prove necessary, the metarule server may be deleted by the "metafirewall delete Server" command.

Although this is not obligatory, the first configuration module 9 may be divided into a plurality of configuration submodules each responsible for activating and setting the parameters (auxiliary parameters) of a separate set of (primary and/or secondary) metarules, so that on receiving primary data only the module that is associated therewith is invoked. In this case, each submodule is adapted to address a portion of the engine 11 that is itself coupled to a portion of the first table T1. Dependency links may exist between modules. In this case invoking a module implies that the module itself in turn invokes the modules from which it depends or with which it is associated. This may further reduce the time necessary to calculate a reconfiguration.

The configuration module 9 and the metafirewall 10 have been described hereinabove in the form of two coupled but separate modules. They could constitute a single module 8, however.

Moreover, a device in itself constituting a firewall has been described. However, it is feasible for the device of the invention not to include the firewall module 5, when the firewall module is already installed in the server 2 in native form. Consequently, in this case, the device of the invention consists only of the management module 8, which must then be installed in the server 2 in order to be coupled therein to the native firewall module.

Furthermore, certain modules of the device 1, such as the first configuration module 9 and the engine 11, may take the form of software module(s). However, they may equally be implemented, at least in part, in the form of electronic circuits (hardware), or in the form of combinations of software modules and electronic circuits. The software modules may be written in Java, C or C++, for example.

Functions of the metafirewall 10 (in particular the naming of rules through the tables T1 and T2) may also be integrated into a standard firewall 5.

The invention also provides a method for the dynamic processing of data for applying to primary data received by a data processing server 12 dedicated processes based on primary rules so that the primary data received is processed before it is transmitted by said server.

This method may be implemented using the device described above. The main and optional functions and subfunctions provided by the steps of the method being substantially identical to those provided by the various means constituting the device described above, only the steps implementing the main functions of the method according to the invention are described hereinafter.

The method comprises a preliminary step in which there are stored in a first table T1 sets of primary rules (called "primary metarules", consisting of at least one primary rule), in a parameterizable form, in corresponding relationship to primary identifiers, after which certain primary identifiers are selected in the first table T1 and, on receipt of auxiliary data representing operating parameters, delivered by the server 2 following the reception of secondary data, at least one of the primary identifiers is selected in the first table and the auxiliary data is associated with that primary identifier, to define the dedicated processes.

Moreover, during the preliminary step, secondary identifiers may be stored in a second table T2, each in corresponding relationship to at least one selected primary identifier associated with auxiliary data.

Furthermore, both selection of the primary metarules in the first table T1 and modification of the auxiliary data associated with the secondary identifier representing the selected primary or secondary metarules in the second table T2 may be executed in parallel.

The invention is not limited to the embodiments of a device and a method described hereinabove by way of example only, but encompasses all variants that the person skilled in the art might envisage that fall within the scope of the following claims.

As understood by those of skill in the art, portions of the devices or servers described herein may be embodied as computer readable code in a computer readable medium. As understood by those of skill in the art, a computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on.

The invention claimed is:

1. A data processing device, including computer-executable instructions stored on a non-transitory computer-readable medium, installed in a data processing server, said device comprising:

a first table storing sets of at least one primary metarule in a parameterizable form and in corresponding relationship to primary identifiers;

a second table storing at least one secondary metarule associated with secondary identifiers, each secondary identifier is in corresponding relationship to at least one primary identifier, wherein at least one priority level is installed between the at least one primary metarule and the at least one secondary metarule; and management module which is coupled to a firewall module of said data processing server and, on receipt of auxiliary data representing operating parameters that request reconfiguration of the firewall module, the auxiliary data delivered by said firewall module after reception by the data processing server of secondary data that requires reconfiguration of the firewall module, selects at least one of the primary identifiers in the first table and associates said auxiliary data therewith so as to define dedicated processes of said firewall module;

wherein the management module reconfigures the firewall module so that a current configuration of the firewall module is modified, based on hardware characteristics of the data processing server, an operating configuration of the data processing server and an occurrence of internal and external events, wherein said firewall module applies said defined dedicated processes to process primary data received by said data processing server, said data processing server transmitting said primary data based on said processing; and wherein said at least one primary metarule is specified according to a string of characters containing a placeholder for each parameter of said primary metarule that is not statically defined, wherein the primary identifier comprises alphabetical characters designating a set of primary rule prototypes.

2. The device according to claim 1, wherein the second table is accessible to said management module and at least one selected primary identifier is associated with auxiliary data.

3. The device according to claim 2, wherein certain selected primary metarules in the second table are grouped into secondary metarules represented by secondary identifiers.

4. The device according to claim 2, wherein said management module is adapted, on receipt of said auxiliary data communicated by the server to add, delete, or modify primary or secondary metarules or auxiliary data in the second table associated with said primary or secondary metarules.

5. The device according to claim 1, wherein said management module, on receipt of said auxiliary data, determines whether the at least one selected primary identifier corresponding to the type of said auxiliary data is present in the second table, and associates the at least one selected primary identifier with new auxiliary data as to adapt said dedicated processes.

6. The device according to claim 1, wherein said management module comprise a multiplicity of management submodules each of which manage the association of auxiliary data with at least one primary or secondary metarule and, on receipt of said auxiliary data, determine which of said management submodules corresponds thereto.

7. The device according to claim 1, wherein said management module and said tables are part of metafirewall which manages a firewall equipping said server.

8. A firewall comprising the device according to claim 1.

9. The data processing device according to claim 1, wherein the primary metarule comprises one of definitions and prototypes of sets of the at least one primary rule.

10. The device according to claim 1, wherein the auxiliary data comprises data or values assigned to operating parameters of the primary rule implemented in the firewall module.

11. The device according to claim 1, wherein the secondary data comprises information received by the data processing server which is required for reconfiguration of the firewall module.

12. A data processing method, comprising:
storing in a first table sets of at least one primary metarule in a parameterized form and in corresponding relationship to primary identifiers;
storing in a second table at least one secondary metarule associated with secondary identifiers, each secondary identifier is in corresponding relationship to primary identifiers, wherein at least one priority level is installed between the at least one primary metarule and the at least one secondary metarule;
on receipt of auxiliary data representing operational parameters that request reconfiguration of a control means, the auxiliary data delivered by the server after the receipt of secondary data that requires reconfiguration of the control means, selecting at least one of the primary identifiers in the first table;
associating said auxiliary data with said selected primary identifier so as to define said dedicated processes; and
applying said dedicated processes based on primary rules to process primary data received by a data processing server, and transmitted by said data processing server based on said processing;
wherein said at least one primary metarule is specified according to a string of characters containing a place-holder for each parameter of said primary metarule that is not statically defined,
wherein the control means is a firewall and a management means configures the firewall so that a current configuration of the firewall is modified, based on hardware characteristics of the data processing server, an operating configuration of the data processing server and an occurrence of internal and external events,
wherein the primary identifier comprises alphabetical characters designating a set of primary rule prototypes.

13. The method according to claim 12, wherein each of the secondary identifiers is in corresponding relationship to at least one selected primary identifier associated with auxiliary data.

14. The method according to claim 13, wherein on receipt of the auxiliary data, it is determined whether the at least one selected primary identifier that corresponds to the type of the auxiliary data is present in the second table, and to associate the at least one selected primary identifier with new auxiliary data so as to adapt said dedicated process.

15. The method according to claim 13, wherein certain primary metarules in the second table are grouped into secondary metarules represented by secondary identifiers.

16. The method according to claim 12, wherein there are executed in parallel the selection of the primary or secondary metarules in the first table and the modifications of the auxiliary data in the second table associated with the secondary identifier representing the selected primary or secondary metarules.

17. The method according to claim 12, wherein on receipt of complementary data communicated by said server, primary or secondary metarules are added to, deleted from or modified in the second table.

18. A network data processing device, comprising:
an engine;
a management module coupled to said engine, said management module comprising:
a first memory containing a first table, said first table containing primary identifiers associated with at least one parameterized rule for providing direction to said engine when one or more of said primary identifiers and said at least one parameterized rule are associated with at least one parameter value; and
a second memory containing a second table, said second table containing at least one secondary metarule associated with secondary identifiers, each secondary identifier associated with at least one of said primary identifiers, wherein at least one priority level is installed between the at least one primary metarule and the at least one secondary metarule,
wherein the management module includes a configuration module which decides when to make modifications to a current configuration of a firewall,
wherein the management module reconfigures the firewall so that a current configuration of the firewall is modified, based on hardware characteristics of the data processing server, an operating configuration of the data processing server and an occurrence of internal and external events,
wherein said engine, in response to receiving said direction, manages network data according to said direction; and
wherein said at least one parameterized rule is specified according to a string of characters containing a place-holder for each parameter of said parameterized rule that is not statically defined, wherein the place-holder is relevant to the rule, and wherein the primary identifier comprises alphabetical characters designating a set of primary rule prototypes.

19. The device according to claim 18, wherein secondary identifiers are further associated with one or more respective parameter values.

20. A method of processing network data, comprising:
- storing, as entries in a first table, first primary identifiers, each with one or more associated first parameterized rules for configuring a firewall;
- storing as entries in a second table, second parameterized rules, each associated with secondary identifiers, each secondary identifier with one or more second primary identifiers and one or more associated parameter values;
- receiving data comprising at least one new parameter value;
- determining at least one associable second primary identifier which said new parameter value can be associated with;
- storing said new parameter value is association with said associable second primary identifier;
- determining current associated parameter values and corresponding parameterized rules for each of said secondary identifiers;
- based on priority levels installed between the first parameterized rules and the second parameterized rules, making a combination of said current associated parameter values and at least one of the first parameterized rules and the second parameterized rules for directing an engine; and
- communicating said combination to said engine so as to direct management of network data by said engine;
- wherein each of said associated parameterized rules is specified according to a string of characters containing a place-holder for each parameter of said associated parameterized rule that is not statically defined, wherein the place-holder is relevant to the rule; and
- wherein a management module reconfigures the firewall so that a current configuration of the firewall is modified, based on hardware characteristics of said engine, an operating configuration of said engine and an occurrence of internal and external events,
- wherein the first primary identifiers comprise alphabetical characters designing a set of primary rule prototypes.

* * * * *